(12) United States Patent
Bronstert

(10) Patent No.: US 6,767,624 B2
(45) Date of Patent: Jul. 27, 2004

(54) PRIMER LAYERS FOR EC WINDOWS

(75) Inventor: Bernd Bronstert, Otterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/207,785

(22) Filed: Jul. 31, 2002

(65) Prior Publication Data

US 2003/0031858 A1 Feb. 13, 2003

(30) Foreign Application Priority Data

Aug. 1, 2001 (DE) .......................................... 101 37 544

(51) Int. Cl.$^7$ .............................. B32B 18/00; G02F 1/15
(52) U.S. Cl. ....................... 428/323; 428/325; 359/270; 359/273
(58) Field of Search ................................. 428/325, 323; 359/265, 267, 270, 273

(56) References Cited

U.S. PATENT DOCUMENTS

| | | | |
|---|---|---|---|
| 4,887,890 A | 12/1989 | Scherber | 350/357 |
| 5,244,557 A | 9/1993 | Defendini | 204/192.29 |
| 5,757,537 A * | 5/1998 | Ellis, Jr. et al. | 359/268 |
| 6,361,709 B1 | 3/2002 | Bauer et al. | 252/62.2 |
| 6,416,905 B1 * | 7/2002 | Bronstert et al. | 429/304 |

FOREIGN PATENT DOCUMENTS

| | | |
|---|---|---|
| DE | 36 43 690 | 7/1988 |
| EP | 461 685 | 12/1991 |
| EP | 499 115 | 8/1992 |
| EP | 1 056 097 | 11/2000 |

OTHER PUBLICATIONS

Materials Res., vol. 2, No. 1, 1–9, 1999, Cronin et al.
Derwent Abst. EP 499115—92-277874/34.

* cited by examiner

Primary Examiner—Monique R. Jackson
(74) Attorney, Agent, or Firm—Keil & Weinkauf

(57) ABSTRACT

The present invention relates to composite elements comprising at least one layer A which comprises at least one solid electrolyte Al, at least one adhesion-promoting layer B having a thickness of <100 μm and at least one component C which provides the composite layer with electrochromic properties, where composite elements of this type are particularly suitable for use in electrochromic windows, and to electrochromic windows and glazing comprising a composite element of this type, and to processes for the production of these composite elements.

15 Claims, No Drawings

PRIMER LAYERS FOR EC WINDOWS

The present invention relates to composite elements which are particularly suitable for use in electrochromic windows, to electrochromic windows and glazing comprising a composite element of this type, and to a process for the production of these composite elements.

Optically transparent polymeric solid electrolytes are known in principle. They are used, in particular, in electrochromic systems, for example in electrochromic glazing. In electrochromic glazing, the light transparency can be regulated reversibly and steplessly by application of electric potentials. The structure of systems of this type is described, for example, in EP-A 461 685, DE-A 36 43 690 and U.S. Pat. No. 5,244,557. Electrochromic glazing typically has the following layer sequence: glass pane—transparent electrically conductive layer—electrochromic electrode—electrolyte—counterelectrode—transparent electrically conductive layer—glass pane.

Electrochromic functional layers are described, for example, in Material Research, Vol. 2, No. 1 (1999), pp. 1 to 9.

Solid electrolytes in these systems take on the job of transporting cations to the electrochromic electrode or away from the electrode, depending on the polarity of the applied electric field. The electrochromic electrode changes its color due to this process. Solid electrolytes which are suitable for use in electrochromic systems have to satisfy a multiplicity of different requirements. They must have high electrical conductivity and preferably also optical transparency in the visible spectral region, and in addition it must be possible for them to be employed in a broad temperature range without adverse effects on their optical, electrical and mechanical properties.

EP-A 461 685 and EP-A 499 115 disclose solid electrolytes comprising polar polymers based on polyethylene oxide, polyethylene oxide copolymers or graft copolymers and comprising conductive salts which are soluble in these polar polymers, in particular Li salts. The solid electrolytes are prepared by dissolving the starting materials in suitable organic solvents, coating the substrates therewith and evaporating the solvent again.

U.S. Pat. No. 5,244,557 discloses electrochromic glazing comprising an electrolyte made from polyethylene oxide and $P_2O_5$. The individual layers of the electrochromic glazing here are bonded to one another, for example, at high temperatures and high pressure.

EP-A 1 056 097 discloses optically transparent solid electrolytes which are built up from a polymeric binder, a filler, a conductive salt and an ion-solvating plasticizer. EP-A 1 056 097 likewise mentions the use of solid electrolytes of this type in electrochromic systems and displays. Here, the solid electrolyte, in particular the polymeric binder present in the solid electrolyte, must be matched to the electrochromic functional layer in order to guarantee the function of the electrochromic window.

Based on this prior art, it is an object of the present invention to provide composite elements which can be used as electrochromic windows and in which, at the same time, a broad range of polymeric binders can be employed for the solid electrolyte layer.

We have found that this object is achieved by a composite element comprising
  A) at least one layer A at least comprising a solid electrolyte Al which comprises at least the following components:
     i) at least one filler I having a primary particle size of from 1 nm to 20 μm,
     ii) at least one polymeric binder II,
  B) at least one adhesion-promoting layer B having a thickness of <100 μm;
  C) at least one component C which provides the composite element with electrochromic properties.

For the purposes of the present invention, the term "electrochromic properties" is taken to mean that a composite element according to the invention exhibits a change in light absorption, in particular in the visible region, on application of a voltage.

It is preferred in accordance with the invention that the at least one component C in the composite element is present in a layer CI.

The layer CI according to the invention can be applied, for example, by vapor deposition. If the layer CI is applied by wet-chemical methods, for example by dipping methods or sol-gel methods, it may, in addition to the at least one component C, comprise further additives and auxiliaries known to the person skilled in the art. Additives and auxiliaries of this type are, for example, binders, precipitants or also flow assistants.

However, it is likewise possible for the purposes of the present invention for component C to be present, for example, in layer A.

If component C is present in layer A, component C is particularly preferably a compound which has different light absorption, in particular in the visible region, in different oxidation states and can be converted reversibly from one oxidation state into another. For example, suitable compounds are those which are colorless in one oxidation state and colored in a second. Compounds of this type are, for example, dihydrophenazines or similar compounds, as described in U.S. Pat. No. 6,249,369 or U.S. Pat. No. 5,278,693.

The adhesion-promoting layer B according to the invention enables the adhesion to be set independently of the polymeric binder II, enabling a larger number of polymeric binders to be employed for the solid electrolyte Al according to the invention. In addition, the adhesion-promoting layer B prevents direct contact of the polymeric binder II with layer CI, also enabling use of polymeric binders which would be unstable in a layer structure with direct contact with layer CI or when subjected to cyclic current.

Particularly suitable for use in electrochromic systems are solid electrolytes Al which are optically transparent.

In a preferred embodiment, the present invention therefore relates to a composite element comprising a solid electrolyte Al which has at least one of properties (1) to (3):
  (1) light absorption <20%,
  (2) conductivity at 20° C. greater than $10^{-7}$ S/cm,
  (3) glass transition temperature $T_g$<−30° C.

For the purposes of the present invention, the solid electrolyte Al preferably satisfies all of properties (1) to (3).

The conductivity of the solid electrolyte Al at 20° C. is, in accordance with the invention, preferably greater than $10^{-7}$ S/cm, in particular greater than $10^{-5}$ S/cm.

The solid electrolyte Al according to the invention comprises, in accordance with the invention, a filler I having a primary particle size of from 1 nm to 20 μm, for example from 1 nm to 1000 nm, in particular from 1 nm to 500 nm, preferably from 1 nm to 300 nm, particularly preferably from 1 nm to 100 nm or also from 5 to 10 nm.

In the case of spherical or approximately spherical particles, these data relate to the diameter, while in the case of particles of irregular shape, for example needle-shaped particles, they relate to the longest axis. In accordance with the invention, preference is given to a very finely divided solid in which the primary particle size is in the region of the wavelength of visible light in order that an optically transparent solid electrolyte is obtained.

Examples of suitable fillers are polymer particles, which may also be crosslinked, such as those comprising polystyrene, polycarbonate or polymethyl methacrylate (for example Agfaperl®). Also suitable are, in particular, inorganic fillers having a primary particle size of from 1 to 300 nm. Examples of suitable inorganic fillers are glass powder, glass nanoparticles, for example Monospher® (Merck), and glass microparticles, for example Spheriglas® (Potters-Ballotini). Also suitable are inorganic oxides and mixed oxides, in particular of the elements silicon, aluminum, magnesium, titanium or calcium. Examples of fillers of this type are silicon dioxide, in particular pyrogenic oxides, for example Aerosil® (Degussa), silicates, for example talc, pyrophyllite, wollastonite, aluminosilicates, for example feldspar, or zeolites. The fillers may also be coated with suitable dispersion aids, adhesion promoters or hydrophobicizing agents. It is also possible to employ mixtures of two or more fillers. Particular preference is given to hydrophobicized pyrogenic silica gel acids, for example Aerosil® R812, Aerosil® R8200 and Aerosil® R974.

The present invention therefore relates, in a further embodiment, to a composite element in which the filler I is an inorganic filler having a primary particle size of from 1 nm to 300 nm.

The filler I is usually present in an amount of from 1 to 80% by weight, based on the sum of all constituents of the solid electrolyte Al. The solid electrolyte Al preferably comprises from 8 to 78% by weight of the filler I, particularly preferably from 10 to 67% by weight, in particular from 20 to 50% by weight.

In principle, suitable polymeric binders II are all thermoplastic polymers having adequate transparency. Particularly suitable are thermoplastics which have a light absorption of less than 20% in the UV/VIS region. Examples of suitable polymers are polyacrylates, in particular those made from acrylates or methacrylates of the general formula $H_2C=CHR^1—COOR^2$, where $R^1$ is methyl or hydrogen, and $R^2$ is a straight-chain, branched or cyclic hydrocarbon radical, for example a methyl, ethyl, n-propyl, isopropyl, n-butyl, isobutyl, sec-butyl, tert-butyl, n-amyl, isoamyl, sec-amyl, tert-amyl, neopentyl, n-hexyl, n-heptyl, n-octyl, 2-ethylhexyl, n-nonyl, isononyl, n-decyl, n-undecyl, n-dodecyl, cyclohexyl, 3,3,5-trimethylcyclohexyl, isobornyl, vinyl or allyl group. In a particular embodiment, the $R^2$ radicals may also carry one or more substituents, in particular chlorine or fluorine. Examples thereof are 2,2,2-trifluoroethyl, 2,2,3,3-tetrafluoropropyl or 1,1,1,3,3,3-hexafluoroisopropyl groups. It is also possible to employ mixtures of two or more acrylates. Also suitable are optically transparent polymers, for example ethylene-vinyl acetate (EVA), modified and unmodified polyvinyl alcohols, polyvinyl chloride (PVC) or polystyrene.

The polymeric binders II employed can also be copolymers of acrylates with one or more comonomers. Particularly suitable comonomers are:

Acrylamides and methacrylamides. Suitable substituents on the amide nitrogen of acrylamide or methacrylamide, besides hydrogen, are the groups mentioned above under $R^2$. It is also possible to employ suitable imides, for example maleimide.

Acrylonitrile or methacrylonitrile.

Styrene derivatives of the general formula (1):

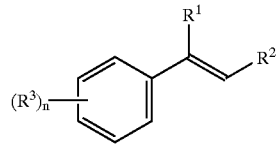

The radical $R^1$ is preferably hydrogen or methyl, and the radicals $R^2$ and $R^3$ are preferably hydrogen or hydrocarbon radicals. The comonomer is preferably styrene.

Straight-chain, branched and/or cyclic C2- to C20-olefins, such as ethylene, propylene, 1-butylene, 2-butylene, butadiene, isoprene, 1-pentene, 2-pentene, 3-pentene, 1-hexene, 2-hexene, 3-hexene, 2,4-hexa-diene, heptenes, octenes, nonenes, decens, cyclohexene and nor-bornene. Preferred comonomers are ethylene, propylene and 1-butylene.

Suitable thermoplastic binders are particularly preferably polymers which are usually employed for the production of optical components from plastics.

Polymers of this type and their properties are described, for example, in "Optical Plastics" (Ullmann's Encyclopedia of Industrial Chemistry, 6th Edition 1998, Electronic Release). Examples of polymers of this type are polymethyl methacrylate, polycyclohexyl methacrylate, copolymers of cyclohexyl methacrylate and methyl methacrylate, copolymers of cyclohexyl methacrylate and/or methyl methacrylate and styrene, polystyrene, styrene-acrylonitrile copolymers, copolymers of styrene and maleic anhydride, polycarbonates, for example those made from bisphenol A and phosgene, polyvinylbutyral, partially or fully hydrolyzed polyvinyl acetate/polyvinyl alcohol or copolymers thereof, such as ethylene-polyvinyl acetate copolymers, diphenyl sulfide carbonate, polytrifluoromethylstyrene, polymethylpentene or cellulose esters, for example cellulose acetate, cellulose propionate or cellulose acetobutyrate. It is also possible to employ suitable thermoplastic polyurethanes, polyolefins or polyesters, such as polyethylene terephthalate or polybutylene terephthalate.

For the purposes of the present invention, it is also possible to employ mixtures of two or more different polymeric binders, provided that the polymers are compatible with one another. The molecular weight of the polymers can be selected depending on the desired properties of the solid electrolyte. The glass transition temperature of the polymer employed should preferably be lower than −30° C.

The polymeric binder II is usually present in an amount of from 5 to 97% by weight, preferably in an amount of from 10 to 80% by weight, particularly preferably from 20 to 50% by weight, in each case based on the sum of all constituents of the solid electrolyte Al.

The solid electrolyte according to the invention may in addition comprise at least one conductive salt III.

Suitable cations for the conductive salt are, for example, $H^+$, $Li^+$, $Na^+$, $K^+$, $Cs^+$, $Mg^{2+}$ or $Ag^+$. The preferred cation for the purposes of the present invention is $H^+$ or $Li^+$. Examples of suitable conductive salts III are LiCl, $LiPF_6$, $LiBF_4$, $LiAsF_6$, $LiCF_3SO_3$, $LiC(CF_3SO_2)_3$, $LiN(CF_3SO_2)_2$, $Li(C_nF_{2n+1})SO_3$, $LiC[(C_nF_{2n+1})SO_2]_3$, $LiN[C_nF_{2n+1})SO_2]_2$, where n is in each case from 2 to 20, $LiClO_4$, $LiN(SO_2F)_2$, $LiSbF_6$, $LiAlCl_4$, $LiSiF_6$, $NaPF_6$, $NaBF_4$, $NaCF_3SO_3$, $NaClO_4$, $KPF_6$, $KBF_4$, $KCF_3SO_3$ and $AgCF_3SO_3$. It is also possible to employ organic salts, for example sodium octylsulfate or lithium dodecylbenzenesulfate. The conductive salt employed is preferably $LiClO_4$, $LiN(CF_3SO_2)_2$ or $LiCF_3SO_3$. It is also possible to employ mixtures of two or more conductive salts in accordance with the invention.

For the purposes of the present invention, however, the solid electrolyte Al may also have polymer-bonded ionic groups. Particular preference is given in accordance with the invention to polymer-bonded acid anions which have $H^+$ or $Li^+$ counterions. In accordance with the invention, the solid electrolyte Al may also comprise polymer-bonded ionic groups and a conductive salt III.

The conductive salt III is usually present in an amount of from 0.5 to 40% by weight, based on the sum of all constituents of the solid electrolyte Al. The solid electrolyte Al preferably comprises from 1 to 20% by weight of the conductive salt III, particularly preferably from 2 to 8% by weight.

If the solid electrolyte Al contains polymer-bonded ionic groups, the sum of the ionic groups preferably corresponds to from 0.05 to 4 mol/l, in particular from 0.1 to 2 mol/l, particularly preferably from 0.2 to 0.8 mol/l.

The solid electrolyte Al according to the invention may in addition also comprise plasticizers. Suitable plasticizers are conventional, high-boiling plasticizers or solvents. It is advantageous to employ plasticizers which are able to solvate ions, in particular Li ions. The plasticizers function firstly as solvents for the conductive salts and furthermore influence the mechanical properties of the solid electrolyte, for example by lowering its glass transition temperature. Suitable plasticizers which are compatible with the binder and filler employed in each case are selected by the person skilled in the art. It should be noted here that the plasticizer must not significantly impair the transparency of the solid electrolyte. It is possible to employ both protic and aprotic plasticizers. Examples of protic plasticizers are glycol and oligomeric polyethylene glycols or polypropylene glycols having terminal OH groups. Plasticizers of this type are available, for example, under the trade name Pluriol®. It is also possible to employ primary alcohols, for example 2-ethylhexanol.

Examples of aprotic plasticizers are linear or cyclic organic carbonates of the general formula $R^4O(CO)OR^5$, where $R^4$ and $R^5$ are each straight-chain or branched alkyl radicals or aryl radicals, which may also carry inert substituents, for example chlorine or bromine. Particularly suitable are carbonates of this type having from 1 to 6 carbon atoms. $R^4$ and $R^5$ may also be linked to one another to form a, for example, 5- or 6-membered ring. It is also possible for C atoms to be substituted by O atoms. Examples of carbonates of this type are ethylene carbonate, propylene carbonate, butylene carbonate, diethyl carbonate, dipropyl carbonate, diisopropyl carbonate, dibutyl carbonate, di(2-methoxyethyl) carbonate or di-(2-butoxyethyl) carbonate. Also suitable are organic phosphates R'R"R'"$PO_4$, where R', R" und R'" are each straight-chain or branched alkyl radicals having from 1 to 8 carbon atoms or aryl radicals, which may also be further substituted. In particular, C atoms may also be substituted by O atoms. R', R" and R'" may also be linked to one another in pairs to form a ring. Examples of suitable phosphates are trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl) phosphate, tridecyl phosphate, diethyl n-butyl phosphate, tris(butoxyethyl) phosphate, tris (2-methoxyethyl) phosphate, tris(tetrahydrofuryl) phosphate, tris(1H,1H,5H-octafluoropentyl) phosphate, tris (1H,1H-trifluoroethyl) phosphate, tris(2-(diethylamino) ethyl) phosphate, tris(methoxyethoxyethyl) phosphate, tris (ethoxycarbonyloxyethyl) phosphate and tricresyl phosphate.

Suitable plasticizers are also esters of organic acids, for example esters of adipic acid or phthalic acid, such as 2-ethylhexyl adipate or 2-ethylhexyl phthalate. Cyclic esters, such as omega-(+/-)-butyrolactone, dimethyl-omega-butyrolactone, diethyl-omega-butyrolactone, omega-valerolactone, 4,5-dimethyl-1,3-dioxolan-2-one, 4,4-dimethyl-1,3-dioxolan-2-one, 4-ethyl-1,3-dioxolan-2-one, 4-methyl-5-ethyl-1,3-dioxolan-2-one, 4,5-diethyl-1,3-dioxolan-2-one, 4,4-diethyl-1,3-dioxolan-2-one, 1,3-dioxan-2-one, 4-methyl-1,3-dioxan-2-one, 5-methyl-1,3-dioxan-2-one, 4,4-dimethyl-1,3-dioxan-2-one, 5,5-dimethyl-1,3-dioxan-2-one, 4,6-dimethyl-1,3-dioxan-2-one, 4,4,6-trimethyl-1,3-dioxan-2-one or 5,5-diethyl-1,3-dioxan-2-one, can advantageously be used. Esters of inorganic acids which contain $-(CH_2-CH_2O)_nCH_3$ groups, in particular esters of boric acid, carbonic acid, sulfuric acid and phosphoric acid, can also advantageously be employed. Esters of said type are disclosed in WO 98/44576, pages 27 to 31. It is also possible to employ ethers, for example dibutyl ether, dihexyl ether, diheptyl ether, dioctyl ether, dinonyl ether, didecyl ether, didodecyl ether, ethylene glycol dimethyl ether, ethylene glycol diethyl ether, 1,2-dimethoxypropane, diethylene glycol dibutyl ether, triethylene glycol dimethyl ether, tetraethylene glycol dimethyl ether or polyglycol alkyl ethers, tetrahydropyran, 1,4-dioxane, 1,3-dioxane, 2,5-diethoxytetrahydrofuran or 2,5-dimethoxytetrahydrofuran. Also suitable are dimethylformamide, N-methylpyrrolidone and acetonitrile. It is also possible for mixtures of different plasticizers to be present in the solid electrolyte Al.

The plasticizer is usually present in an amount of from 0 to 90% by weight, based on the sum of all constituents of the solid electrolyte. The solid electrolyte preferably comprises from 1 to 70% by weight, in particular from 10 to 50% by weight, of the plasticizer, particularly preferably from 20 to 40% by weight.

The solid electrolyte Al according to the invention may in addition comprise further additives and auxiliaries. For example, antioxidants, for example Irganox®, Ultranox® or Sicostab®, UV stabilizers, for example Uvinul® or Irgastab®, may be present. Furthermore, dispersion aids, for example Lutensol® or Sokalan®, for the filler or adhesion promoter can be employed.

The amount of additives and auxiliaries can be selected as needed by the person skilled in the art. However, the proportion of the additives and auxiliaries, based on the sum of the constituents of the solid electrolyte Al, is, in accordance with the invention, not greater than 30% by weight, preferably not greater than 20% by weight, in particular not greater than 10% by weight.

In a preferred embodiment of the invention, layer A, which comprises at least the solid electrolyte Al, is in the form of a film. The thickness of the film is selected depending on the desired application. For example, the films can have thicknesses of from 5 $\mu$m to 5 mm. The films preferably have a thickness of from 10 $\mu$m to 2 mm, in particular from 100 $\mu$m to 1.5 mm, particularly preferably from 0.5 to 1 mm.

The solid electrolyte Al according to the invention may be uncrosslinked, but may also be in crosslinked form. In the latter case, it also comprises the products of the reaction of the compounds added for crosslinking, i.e., for example, the polymers resulting from the photopolymerization of ethylenically unsaturated compounds with suitable photoinitiators.

All constituents of the solid electrolyte Al according to the invention form a homogeneous, preferably colorless and crystal-clear composition. The filler I here is preferably uniformly dispersed in the binder II, and the conductive salt III is preferably completely dissolved. The light absorption of the solid electrolyte Al and also of the layer A is preferably less than 20%, particularly preferably less than 15%. However, the solid electrolyte Al according to the invention or the layer A may, for the purposes of the present invention, alternatively be milky, i.e. with a relatively high scattering content, or colored if this is necessary for a particular application.

The solid electrolyte Al can be prepared, for example, by melt extrusion. However, the invention also covers other procedures, for example dissolution of all constituents apart from the filler in a suitable solvent, uniform dispersion of the filler therein, casting of a layer onto a suitable substrate, and re-evaporation of the solvent.

A further process variant, albeit not a preferred one, is firstly to prepare the solid electrolyte Al without the conductive salt III, and to incorporate the conductive salt III at a later time by soaking the solid electrolyte Al with a solution of the conductive salt in a suitable solvent.

The solid electrolyte Al according to the invention may also be crosslinked. The crosslinking can be carried out thermally by adding to the starting materials thermal crosslinking agents which do not yet crosslink at the process temperature of the melt extrusion. After the extrusion, the crosslinking is initiated by heating the molding or the film to elevated temperatures. However, preference is given to radiation crosslinking. Crosslinking agents or auxiliaries, for example photo-initiators, necessary for this purpose are added to the starting materials and compounded and melt-extruded therewith. The radiation crosslinking can be carried out, for example, by irradiation with high-energy radiation, such as ionic radiation, ionizing radiation, electron beams, X-rays or gamma rays, if desired using additional initiators. The crosslinking is advantageously carried out with actinic light, in particular with UV light. To this end, compounds which can be polymerized in a known manner, or monomers, can be employed. The monomers have at least one polymerizable ethylenic double bond. The choice of type and amount depends on the desired properties of the solid electrolyte and on the compatibility with the other components, in particular with the binder. Particularly suitable here are polar monomers which bind or solvate ions and can therefore contribute toward the conductivity. Examples of preferred compounds which may be mentioned are those containing hydroxyl groups, amide groups or polyethylene glycol structural units. Mono- and polyacrylates and/or -methacrylates of monohydric and polyhydric alcohols are also highly suitable. For example, it is possible to employ (meth)acrylates of alkanols having from 1 to 20 carbon atoms, such as methyl (meth)acrylate, ethyl (meth)acrylate, propyl (meth)acrylate, isopropyl (meth)acrylate, cyclohexyl (meth)acrylate; (meth)acrylates of polyhydric alcohols having from 2 to 20 carbon atoms, for example 2-hydroxyethyl (meth)acrylate, 2-hydroxypropyl (meth)acrylate, ethylene glycol di(meth)acrylate, butanediol di(meth)acrylate, polyethylene glycol di(meth)acrylate or 1,1,1-trimethylolpropane tri(meth)acrylate, furthermore polyethylene glycol mono(meth)acrylate monomethyl ether and 2-diethylaminoethyl acrylate. Also suitable are epoxide and urethane (meth)acrylates, as can be obtained, for example, by reaction of bisphenol A diglycidyl ether with (meth) acrylic acid or by reaction of mono- or diisocyanates with hydroxyalkyl (meth)acrylates and, if desired, with hydroxyl-containing polyesters or polyethers. Also suitable are derivatives of acrylamide and methacrylamide, for example ethers of their N-methylol derivatives with monohydric and polyhydric alcohols, for example ethylene glycol, glycerol, 1,1, 1-trimethylolpropane, or oligomeric or polymeric ethylene oxide derivatives.

Suitable initiators for the photopolymerization are, inter alia, benzoin or benzoin derivatives, such as alpha-methylbenzoin or benzoin ethers, benzil derivatives, such as benzil ketals, acylarylphosphine oxides, acylarylphosphinic acid esters, polycyclic quinones or benzophenones.

The crosslinking with actinic light can be carried out immediately after preparation of the solid electrolyte Al, i.e., for example, by irradiating and crosslinking the solid electrolyte film produced by extrusion using a suitable irradiation device immediately after the extruder. However, it is also possible to delay the crosslinking until a later point in time, for example until after incorporation into electrochromic glazing.

The composite element according to the invention has at least one adhesion-promoting layer B having a thickness of <100 $\mu$m. In principle, all adhesion-promoting layers known to the person skilled in the art can be employed. The adhesion-promoting layer B is particularly advantageously a layer comprising at least 33% by weight, based on the total adhesion-promoting layer B, of a modified polyvinyl alcohol. Mixtures of two or more different modified polyvinyl alcohols can also be employed in accordance with the invention, with the sum of different modified polyvinyl alcohols making up at least 33% by weight of the adhesion-promoting layer B. The adhesion-promoting layer may, in accordance with the invention, also in particular comprise more than 50% by weight, preferably more than 80% by weight, particularly preferably more than 95% by weight, in each case based on the entire adhesion-promoting layer B, of a modified polyvinyl alcohol or of a mixture of two or more thereof.

For the purposes of the present invention, particular preference is given to acetals, hemiacetals or ketals of a polyvinyl alcohol, for example polyvinylbutyral. However, it is also possible in accordance with the present invention to employ layers comprising polyethylene oxide.

Therefore, the present invention also relates in a preferred embodiment to a composite element with an adhesion-promoting layer B comprising at least 33% by weight of an acetal of a polyvinyl alcohol, of a ketal of a polyvinyl alcohol or of a hemiacetal of a polyvinyl alcohol or of a mixture of two or more thereof.

In accordance with the invention, the adhesion-promoting layer B has a thickness of <100 $\mu$m, in particular from 0.01 $\mu$m to 10 $\mu$m, particularly preferably from 0.1 $\mu$m to 5 $\mu$m, for example from 0.1 $\mu$m to 4 $\mu$m. The adhesion-promoting layer B, which is very thin in accordance with the invention, results in significantly improved adhesion of the individual layers of the composite element according to the invention, but has only an insignificant effect on the conductivity between the layers.

The adhesion-promoting layer B can be applied, for example, from solution. However, it is likewise possible for the adhesion-promoting layer B to be applied by polymerization or vapor deposition or for the adhesion-promoting layer B to be applied in the form of a film. It is preferred in accordance with the invention for the adhesion-promoting layer B to be applied from solution.

In a further embodiment, the invention relates to a composite element in which the adhesion-promoting layer B is a layer comprising at least 33% by weight of polyvinylbutyral, based on the entire adhesion-promoting layer B.

Due to the adhesion-promoting layer B, the composite element according to the invention also has improved breakage security. This is particularly advantageous on use of the composite elements according to the invention in glazing.

The composite element according to the invention furthermore has at least one component C which provides the composite element with electrochromic properties. For the purposes of the present invention, component C can in principle be any compounds known to the person skilled in the art which provide the composite element with electrochromic properties, i.e., in particular, result in a color change in the visible region on application of a voltage. For example, component C can comprise redox-active electrochromic compounds. If component C is present in a layer CI, $WO_3$ is particularly preferred.

In a preferred embodiment, the invention therefore relates to a composite element comprising a layer CI which comprises $WO_3$ as component C.

If the composite element according to the invention comprises at least one component C in a layer CI, the composite element according to the invention preferably has a further layer CII which comprises $CeTiO_2$, $V_2O_5$, $TiV_2O_5$, $CrV_2O_5$, $NbV_2O_5$, $Ni(OH)_2$, $Nb_2O_5$ or $Ir_2O_2$ or a mixture of two or more of these compounds, it additionally being possible for these to intercalate other metal atoms into their lattice.

In particular, the further layer CII preferably comprises $CeTiO_2$, $V_2O_5$, $TiV_2O_5$ or $Ni(OH)_2$ or a mixture of two or more of these compounds.

The present invention therefore also relates to a composite element which comprises a further layer CII comprising $CeTiO_2$, $V_2O_5$, $TiV_2O_5$, $CrV_2O_5$, $NbV_2O_5$, $Ni(OH)_2$, $Nb_2O_5$ or $Ir_2O_2$ or mixtures of two or more of these compounds.

Besides layer A, which comprises at least one solid electrolyte Al, the adhesion-promoting layer B and component C, which provides the composite element with electrochromic properties, the composite element according to the invention may also have further layers. In particular the composite element according to the invention can have further optically transparent support layers, for example made from glass or optically transparent polymers, and one or more conductivity layers D. The conductivity layer may be, for example, an ITO (indium tin oxide) layer, an FTO (fluorine-doped tin oxide) layer or an ATO (antimony-doped tin oxide) layer.

In a preferred embodiment, the present invention therefore also relates to a composite element which additionally comprises one or more conductivity layers D.

For the purposes of the present invention, the composite element preferably has at least one support layer, which is preferably a rigid thin layer, for example made of glass. However, it is likewise possible for the purposes of the present invention for the support layer to be a rigid thin layer made from an optically transparent polymer. The term "optically transparent" is taken to mean that the light absorption of the layer in the visible region is <20%.

A composite element according to the invention can be produced, for example, by bringing the individual layers into contact with one another. For the purposes of the invention, it is possible to apply the adhesion-promoting layer B to layer A, and in turn to apply a layer CI comprising component C to layer B.

The adhesion-promoting layer is preferably applied from solution. In principle, it is possible to employ any coating methods here. Suitable for the purposes of the present invention are application of the adhesion-promoting layer B, for example, by casting methods, dipping methods, spraying methods, spin-coating methods or by roller or knife coating.

It is particularly preferred in accordance with the invention firstly to bring the support layer into contact with the conductivity layer D. Layer CI comprising component C is preferably applied subsequently. An adhesion-promoting layer B is preferably applied to this layer. Layer A comprising a solid electrolyte Al can, for example, subsequently be applied in the form of a polymer film, in particular by means of a roller. Layer A is preferably applied at a temperature of from 0° C. to 140° C., for example from 25° C. to 140° C. It is particularly preferred in accordance with the invention for a further adhesion-promoting layer B and a further layer CII to be applied to the composite element. A second support layer, which is likewise coated with a conductivity layer D, can be applied to this further layer CII.

In a particularly preferred embodiment of the present invention, a support layer is brought into contact with the conductivity layer D, and layer CI comprising at least one component C is subsequently applied. An adhesion-promoting layer B is applied to this layer, and layer A at least comprising a solid electrolyte Al is in turn applied to layer B. A second support layer is likewise brought into contact with a conductivity layer D, and the further layer CII is subsequently applied. An adhesion-promoting layer B is applied to this layer. These two supports coated in this way are subsequently brought into contact with one another. For the purposes of the present invention, the two supports coated in this way are preferably bonded to one another by wet lamination or by hot lamination.

The present invention also relates to a process for the production of a composite element according to the invention or of an electrochromic window or of glazing in which the individual layers are brought into contact with one another.

In a preferred embodiment, the present invention relates to a process in which the adhesion-promoting layer is applied from solution.

The composite elements according to the invention are particularly suitable for use in electrochromic windows or displays. The present invention therefore also relates to the use of a composite element according to the invention in electrochromic windows or glazing and in displays.

In addition, the present invention also relates to electrochromic windows and glazing for automobiles or buildings comprising a composite element according to the invention.

It is, for example, also possible for glazing comprising a composite element according to the invention to be heated by application of an alternating voltage. This additional function in addition to the direct-current connection for electrochromic glazing is particularly advantageous for glazing for automobiles.

The present invention will now be explained in greater detail below with reference to examples.

EXAMPLES

Production Example

A glass plate with a conductivity coating (TEC 15/3 glass from Pilkington) and a $WO_3$ layer having a thickness of 0.4 $\mu$m applied by sputtering was dipped into a solution of 40 parts by weight of polyvinylbutyral (Clariant) in 960 parts by weight of tetrahydrofuran and dip-coated at a drawing rate of 0.5 cm/second, with a polyvinylbutyral layer with a thickness of about 0.003 mm remaining on the glass after drying at 100° C. for 30 minutes.

A second TEC 15/3 glass plate with a $V_2O_5$ layer having a thickness of 0.4 $\mu$m applied by sputtering was then likewise dip-coated with 0.003 mm of polyvinylbutyral.

A polymer electrolyte film having a thickness of 0.8 mm which had been produced by extrusion between polyester protective films comprising 30 parts by weight of polymethyl methacrylate, 35 parts by weight of pyrogenic hydrophobicized silica (Aerosil® R8200), 30 parts by weight of tetraethylene glycol dimethyl ether and 5 parts by weight of lithium perchlorate conductive salt was, after removal of one of the protective films, laminated onto the first glass plate with the aid of a roll laminator at a roll temperature of 100° C. and at a rate of 1 m per minute in such a way that the polymer electrolyte layer was laminated with the $WO_3$ layer with no air bubbles.

After removal of the second protective film, this glass plate was then laminated together with the second glass sheet (with the $V_2O_5$ coating) in the same manner in a roll laminator to give a laminated glass sheet. As an alternative lamination process, it was also possible to replace the hot lamination by wet lamination, or it was possible to carry out the two process in mixed form. To this end, for example, the glass plate with the polymer electrolyte layer facing upward was immersed in a flat dish containing plasticizer (for example tetraethylene glycol dimethyl ether; in some cases also containing conductive salt). The second glass plate with the $V_2O_5$ coating side facing downward was immediately thereafter placed on the first glass sheet while avoiding the introduction of air bubbles. This plate combination was removed from the lamination bath with constant application of pressure. The adhesion formed due to the plasticizer being knocked into the polymer electrolyte layer within a few seconds and reached the end value after conditioning of the laminated glass sheet (at from 80° C. to 160° C.; time duration, depending on the temperature: hours to minutes).

In the laminated glass sheet of this example, the first lamination was produced by the hot lamination process and the second lamination by the wet lamination process (lamination liquid: tetraethylene glycol dimethyl ether without conductive salt; conditioning: one hour at 100° C.).

In order to characterize the adhesion, the peel adhesion was measured by means of a Zwick ETZW 1435 universal testing machine on the two glass plates with a peel direction perpendicular to the glass surface on the two half laminates on $WO_3$ and $V_2O_5$. Half laminates were in each case the polymer electrolyte films which were laminated to the $WO_3$ or $V_2O_5$ glass sheet as described above, but with a polyester film (self-adhesive tape of high adhesion) instead of the second glass sheet. The projecting end of this adhesive tape was clamped into the upper peel-off jaw of the tensile testing machine, while the lower peel-off jaw engaged with a roller sledge, by means of which the glass plate was moved horizontally. The diameter of the rolls of this roll sledge were 10 mm.

Adhesion Measurements on Half-laminate Strips with a Width of 1.5 cm:
  Adhesion to the $WO_3$ layer: 11 [N/1.5 cm]
  Adhesion to the $V_2O_5$ layer: 9 [N/1.5 cm]
Characterization of the Polymer Electrolyte Conductivity by Impendance Measurement between Platinum Electrodes: 0.0005 [S/cm] at 28° C.
Characterization of the Glass Fracture Resistance:
  Falling-ball test with a 250 g steel ball from a height of 3 m onto a 30*30 cm laminated glass sheet of this example: the balls were stopped by the glass sheet, no large glass splinters: test passed.

Comparative Example

The procedure was carried out exactly as in the above example, with the only exception that the polyvinylbutyral-coated glass sheets were replaced by non-PVB-coated glass sheets.

Adhesion Measurements to Half Laminate Strips with a Width of 1.5 cm:
  Adhesion to the $WO_3$ layer: 0.4 [N/1.5 cm]
  Adhesion to the $V_2O_5$ layer: 0.3 [N/1.5 cm]
Characterization of the Polymer Electrolyte Conductivity by Impendance Measurement between Platinum Electrodes: 0.0006 [S/cm] at 25° C.
Characterization of the Glass Fracture Resistance:
  Falling-ball test with a 250 g steel ball from a height of 3 m onto a 30*30 cm laminated glass sheet of this comparative example: the balls fell through the glass sheet, large glass splinters flew around, the test was failed.

I claim:
1. A composite element comprising
   A) at least one layer A at least comprising a solid electrolyte Al which comprises at least the following components:
      i) at least one filler I having a primary particle size of from 1 nm to 20 µm,
      ii) at least one polymeric binder II,
   B) at least one adhesion-promoting layer B having a thickness of <100 µm;
   C) at least one component C which provides the composite element with electrochromic properties,
wherein the solid electrolyte Al has the following properties (1) to (3):
   (1) light absorption <20%,
   (2) conductivity at 20° C. greater than $10^{-7}$ S/cm,
   (3) glass transition temperature $T_g$<–30° C.

2. A composite element as claimed in claim 1, wherein the at least one component C is present in the composite element in a layer CI.

3. A composite element as claimed in claim 1, wherein the filler I is an inorganic filler having a primary particle size of from 1 nm to 300 nm.

4. A composite element as claimed in claim 2, wherein the filler I is an inorganic filler having a primary particle size of from 1 nm to 300 nm.

5. A composite element as claimed in claim 1, wherein component C is $WO_3$.

6. A composite element as claimed in claim 2, wherein component C is $WO_3$.

7. A composite element as claimed in claim 1, wherein the composite element has a further layer CII comprising $CeTiO_2$, $V_2O_5$, $TiV_2O_5$, $CrV_2O_5$, $NbV_2O_5$, $Ni(OH)_2$, $Nb_2O_5$ or $Ir_2O_2$ or a mixture of two or more of these compounds.

8. A composite element as claimed in claim 2, wherein the composite element has a further layer CII comprising $CeTiO_2$, $V_2O_5$, $TiV_2O_5$, $CrV_2O_5$, $NbV_2O_5$, $Ni(OH)_2$, $Nb_2O_5$ or $Ir_2O_2$ or a mixture of two or more of these compounds.

9. A composite element as claimed in claim 1, wherein the adhesion-promoting layer B is a layer comprising at least 33% by weight of an acetal of a polyvinyl alcohol, of a ketal or a polyvinyl alcohol or of a hemiacetal of a polyvinyl alcohol or of a mixture of two or more thereof.

10. A composite element as claimed in claim 2, wherein the adhesion-promoting layer B is a layer comprising at least 33% by weight of an acetal of a polyvinyl alcohol, of a ketal or a polyvinyl alcohol or of a hemiacetal of a polyvinyl alcohol or of a mixture of two or more thereof.

11. A composite element as claimed in claim 1, wherein the adhesion-promoting layer B is a layer comprising at least 33% by weight of polyvinylbutyral.

12. A composite element as claimed in claim 2, wherein the adhesion-promoting layer B is a layer comprising at least 33% by weight of polyvinylbutyral.

13. A composite element as claimed in claim 1, wherein the composite element additionally comprises one or more conductive layers D.

14. An electrochromic window comprising a composite element as claimed in claim 1.

15. An electrochromic window comprising a composite element as claimed in claim 2.

* * * * *